United States Patent [19]

Skutnik et al.

[11] Patent Number: 4,707,076
[45] Date of Patent: Nov. 17, 1987

[54] COATING COMPOSITIONS FOR OPTICAL FIBERS

[75] Inventors: Bolesh J. Skutnik, New Britain; Harry L. Brielmann, Jr., West Hartford, both of Conn.

[73] Assignee: Ensign-Bickford Industries, Inc., Simsbury, Conn.

[21] Appl. No.: 722,828

[22] Filed: Apr. 12, 1985

[51] Int. Cl.⁴ ................................................. G02B 6/16
[52] U.S. Cl. .............................. 350/96.34; 350/96.23; 350/96.30; 427/163; 428/378; 525/502; 525/910; 525/932
[58] Field of Search ............... 350/96.23, 96.29, 96.30, 350/96.31, 96.32, 96.33, 96.34; 427/163, 165; 428/375, 378, 391; 525/502, 910, 911, 932

[56] References Cited

U.S. PATENT DOCUMENTS

| | | | |
|---|---|---|---|
| 4,125,644 | 11/1978 | Ketley et al. | 427/36 |
| 4,511,209 | 4/1985 | Skutnik | 350/96.34 |
| 4,514,037 | 4/1985 | Bishop et al. | 350/96.23 |
| 4,572,610 | 2/1986 | Krajewski | 350/96.34 |
| 4,575,437 | 3/1986 | Kojima et al. | 350/96.34 X |
| 4,585,306 | 4/1986 | Ohmori et al. | 350/96.34 |
| 4,645,297 | 2/1987 | Yoshihara et al. | 350/96.23 |
| 4,660,927 | 4/1987 | Kondow et al. | 350/96.34 |

*Primary Examiner*—John Lee
*Attorney, Agent, or Firm*—Hayes & Reinsmith

[57] ABSTRACT

Curable compositions having at least one ethylenically unsaturated monoene, a polyene and a curing initiator are disclosed for use with optical fibers. The monoene and polyene components may be substituted with organo functional compounds to selectively vary the properties of the cured compositions.

23 Claims, No Drawings

COATING COMPOSITIONS FOR OPTICAL FIBERS

BACKGROUND OF THE INVENTION

The present invention relates to curable compositions which include at least one monoene, a polyene and a curing initiator. As desired, additives of various structures may be incorporated into the carbon chains of the monoene and/or polyene components to provide such properties as increased strength, water resistance, thermal stability and optical qualities to the resultant compositions.

BRIEF DESCRIPTION OF THE PRIOR ART

It is well known that functional protective overlayers of curable synthetic organic coating compounds are formed with thiols or polythiols as necessary components. The thiol or polythiol components of the prior art compounds provide for the formation of solid, self-supporting cured compounds under ambient conditions in the presence of a free radical generator or under high energy irradiation. Illustrative of such known compounds are those disclosed in U.S. Pat. Nos. 4,125,644, 3,787,303, 3,662,022 and 3,864,229.

OBJECTS AND SUMMARY OF THE INVENTION

A principle object of this invention is to provide curable compositions wherein the constituents of the compositions can be selectively modified to vary the properties of the compositions for predetermined end use.

It is another object of the present invention to provide compositions which have improved resistance to moisture and chemicals for use in treating a wide range of articles.

It is still another object of the invention to provide curable coating compositions which do not require a thiol or polythiol as a synergist.

Other objects will be in part obvious and in part pointed out in more detail hereinafter.

The curable compositions disclosed in this invention have as the main components: (1) at least one monoene; (2) polyene; and (3) a curing initiator, such as a UV photoinitiator. The percent levels of each of these components can be varied relative to one another over a wide range. Organo functional groups can be integrated into the carbon chains of these main components to form compositions having a wide variety of applications. The components are combined and cured in an efficient manner without requiring a thiol or polythiol to act as the coupling agent or synergist for the composition. Curing of the applied composition is effected by exposure to free radical generation, such as actinic radiation, to form typically, clear tough, durable coatings for use in such diverse arts as fiber optics and adhesives.

DETAILED DESCRIPTION OF THE INVENTION AND PREFERRED EMBODIMENTS

The curable compositions may be composed of polymerizable monoenes including mixtures of two, three or more monoenes. As used herein, monoenes refer to simple and complex ethylenically unsaturated species having one reactive carbon-to-carbon bond per average molecule. Examples of operable monoenes are the mono unsaturated esters, ethers, amines and silanes, esters of mono unsaturated acids such as acrylic acid, methacrylic acid, butenoic acid, crotonic acid, itacontic acid, maleic acid, ethacrylic acid and the salts thereof, acrylates and methacrylates, along with the esters of mono unsaturated alcohols such as allylester and vinylesters. Specifically, monoenes useful herein include, but are not limited to, dimethyl itaconate, 1H, 1H, 11H-perfluoroundecyl methyl itaconate, di-1H, 1H, 11H perfluoroundecyl maleate, perfluoroundecyl crotonate, crotyl perfluoro octanoate, isobornyl acrylate, isocyanatoethyl methacrylate, iso-octylacrylate, 1H, 1H, 11H-eicosafluoroundecyl acrylate, gamma-methacryloxypropyltrimethyoxysilane, 2-hydroxy-2methyl-1phenyl-propan-1-one, 3-methacryloxypropyl-tris (methoxyethyoxy-silane) and the urethane of isocyanatoethyl methacrylate and the like, including blends thereof. The various monoenes may be obtained commercially or may be readily prepared from commercially available reactants. Useful weight percentages of the composition for the monoene component are from about 10.0% to about 95.0%, with preferred a range of about 35.0% to about 95.0%.

The properties of the compositions can be modified by mixing two or more monoenes or by the integration of various functional groups into the monoene basic structure. The composition will then be made up of differing functional units and the properties of the resultant composition can be varied in this way.

This can be done, for instance, by including in the composition a halogenated monoene such as a fluorinated monoene. such a fluorinated monoene as 1H, 1H, perfluoro-octylacrylate (at 20% to 60% by weight of the monoene) can be readily incorporated into the composition. The effect is to make the cured composition readily useable as an opticl coating where the refractive index of the composition is critical. Likewise, the addition of a fluorinated compound will increase the thermal stability and electrical resistivity of the resultant composition. In the case where a low coefficient friction is desired, the addition of a fluorinated monoene will also provide this desired property.

Yet another example of the versatility of the composition of this invention is illustrated in TABLE I.

Table I indicates successful combinations of the composition inventions wherein the resultant hardness of the composition (after curing) can be modified by the choice of components and/or the percentages of components. Specifically, the test results shown in TABLE I illustrates the results of the hardness testing when the monoene component was varied by several different methods, such as weight percent, chemical structure and balancing the combinations of monoenes, to produce compositions of varying hardness.

TABLE I

| | Weight Precentage | Compound Composition | A-2 Scale Shore Hardness |
|---|---|---|---|
| A. Constant percentage of monoene, different combinations of monoene. | | | |
| 1. | 90.0 | isodecyl acrylate | 31.0 |
| | 9.3 | trimethylolpropane triacrylate | |
| | 0.7 | 2-hydroxy-2-methyl-1-phenylpropan-1-one | |
| 2. | 68.0 | isodecyl acrylate | 42.0 |
| | 23.0 | isobornyl acrylate | |
| | 9.3 | trimethylolpropane triacrylate | |
| | 0.7 | 2-hydroxy-2-methyl-1-phenylpropan-1-one | |

TABLE I-continued

| | Weight Precentage | Compound Composition | A-2 Scale Shore Hardness |
|---|---|---|---|
| 3. | 23.0 | isodecyl acrylate | 93.0 |
| | 68.0 | isobornyl acrylate | |
| | 9.3 | trimethylolpropane triacrylate | |
| | 0.7 | 2-hydroxy-2-methyl-1-phenylpropan-1-one | |
| 4. | 90.0 | isbornyl acrylate | 94.7 |
| | 9.3 | trimethylolpropane triacrylate | |
| | 0.7 | 2-hydroxy-2-methyl-1-phenylpropan-1-one | |
| B. Different Percentage of Monoene and Combinations of monoenes. | | | |
| 1. | 73.8 | isodecyl acrylate | 78.0 |
| | 25.4 | trimethylolpropane triacrylate | |
| | 0.7 | 2-hydroxy-2-methyl-1-phenylpropan-1-one | |
| 2. | 55.0 | isodecyl acrylate | 83.0 |
| | 19.0 | isobornyl acrylate | |
| | 25.4 | trimethylolpropane triacrylate | |
| | 0.7 | 2-hydroxy-2-methyl-1-phenylpropan-1-one | |
| 3. | 55.0 | isobornyl acrylate | 90.0 |
| | 19.0 | isodecyl acrylate | |
| | 25.35 | trimethylolpropane triacrylate | |
| | 0.7 | 2-hydroxy-2-methyl-1-phenylpropan-1-one | |
| 4. | 73.8 | isobornyl acrylate | 94.0 |
| | 25.4 | trimethylolpropane triacrylate | |
| | 0.7 | 2-hydroxy-2-methyl-1-phenylpropan-1-one | |
| C. Different Percentage of Same Monoene. | | | |
| 1. | 90.0 | isodecyl acrylate | 6.0 |
| | 9.3 | trimethylolpropane triacrylate | |
| | 0.7 | 2-hydroxy-2-methyl-1-phenylpropan-1-one | |
| 2. | 73.8 | isodecyl acrylate | 25.0 |
| | 25.5 | trimethylolpropane triacrylate | |
| | 0.7 | 2-hydroxy-2-methyl-1-phenylpropan-1 one | |
| 3 | 50.0 | isodecyl acrylate | 70.0 |
| | 49.3 | trimethylolpropane triacrylate | |
| | 0.7 | 2-hydroxy-2-methyl-1-phenylpropan-1-one | |
| 4. | 10.0 | isodecyl acrylate | 82.0 |
| | 89.3 | trimethylolpropane triacrylate | |
| | 0.7 | 2-hydroxy-2-methyl-1-phenylpropan-1-one | |

The hardness of the compositions was determined by the Shore Hardness test under either the A-2 or D-2 scale. As can be seen from the above information, the hardness is controlled by the several different factors to produce tailored compositions for a desired use. Moreover, the results of Table I illustrate the fact that the other properties of compositions, mentioned above, can be tailored to obtain desired characteristics for the composition on a chosen substrate.

Other organofunctional compounds or complexes can be substituted in the basic monoene component. By substituting a silane compound, compositions suitable for use in bonding substrate materials and in making connections in optical fiber technology can be produced.

Similarly, other functional groups can be added to modify the properties of any given composition having the basic three components. The flame retardancy of the composition can be increased by the addition of fluorine and/or other halogens, while the water repulsion of compositions can be enhanced by incorporating alkyl chains of greater than six carbon lengths.

In the specific application where bonding to glass is required, an alkoxy or hydroxy silane functional group may be integrated into the monoene or polyene component to generate bonding to the silica (glass), for example coatings for graded index optical fibers, fiberglass filaments and the like.

Additionally, compositions to be cured in accord with the present invention may, if desired, include such additives as antioxidants, inhibitors, activators, fillers, pigments, dyes, antistatic agents, flame retardant agents, thickeners, surface-active agents, viscosity modifiers, plasticizers and the like within the scope of the invention. The type and concentrations of the additives, and/or combinations must be selected with care so that the final compositions has the desired characteristics while remaining curable by free radical mechanisms.

The polyene component may be a simple or complex organic compound having a multiplicity of functional groups per molecule, and as with the monoene component, may be tailored by substitutions of organo functional compounds for controlling the resultant characteristics of the composition. The term polyene is used herein to define ethylenically unsaturated compounds which contain at least 2 or more reactive unsaturated carbon-to-carbon bonds per molecule. The preferred polyenes are characterized by the ability to quickly thermoset upon exposure to the curing activity. Preferably the polyene component has two or more reactive unsaturated carbon-to-carbon bonds located terminally or pendant from the main carbon chain.

Examples of such polyenes include, divinyl benzene, diallyl esters of polycarboxylic acids, triallyl terephthalate, N, N'-methylene diacrylamide, diallyl maleate, diallyl fumarate, divinyl adipate, diallyl succinate, divinyl ether, the divinyl ethers of ethylene glycol or diethylene glycol diacrylate, polyethylene glycol diacrylates or methacrylates and the like of the aforementioned cross linking monoenes. The most preferred include trimethylolpropane triacrylate, triallyl cyanurate and pentaerythritol acrylate. Other specific examples of commercially available polyenes include, but are not limited to allyl acrylate, allyl methacrylate and N, N'-methylene diacrylamide, and divinylbenzene and the like. Another class of polyenes which are particularly useful are the polyurethanes which contain sufficient reactive carbon-to-carbon locations for the placement of other functional or additive groups.

Useful ranges of the polyene component are from about 2.0% to about 70.0% of the weight percent of composition, and preferably from about 4.0% to about 45.0%.

Practically any curing initiator agent or curing rate accelerator can be used. Although as a practical matter, UV curing is preferred, it is recognized that free radical generating reagents may be employed as well as high energy radiation bombardment and thermal curing. Curing rate accelerators useful herein include 2-hydroxy-2-methyl-1-phenyl propan-1-one, methyl, ethyl, propyl or isobutyl ethers of benzoin and other analogs, and 2, 2-dimethoxy, 2-phenyl-acetophenone. The curing agent may be included in any effective amount; generally, suitable levels are from about 0.4% to about 20% of the weight composition of composition, and preferably from about 0.7% percent by weight of the composition to about 10%.

The following Table II indicates representative examples of successful combinations of compositions formed in accordance with this invention. As shown, it is possible to tailor the refractive index of compositions to enhance the composition's function as a cladding or optical coating for fused silica, glass or quartz optical fiber substrates.

TABLE II

| Components/Composition | 1 | 2 | 3 | 4 | 5 | 6 | 7 | 8 | 9 | 10 | 11 | 12 | 13 |
|---|---|---|---|---|---|---|---|---|---|---|---|---|---|
| Dimethyl Itaconate | 46.1 | 56.3 | | | | | | | | | | | |
| 1H, 1H, 11H—Perfluoroundecyl Methyl Itaconate | | | 37.8 | | | | | | | | | | |
| Di—1H, 1H, 11H—Perfluoroundecyl Maleate | | | | 50.9 | | | | | | | | | |
| Perfluoroundecyl Crotonate | | | | | 56.3 | | | | | | | | |
| Crotyl Perfluoro Octanoate | | | | | | 50.0 | 56.3 | | | | | | |
| Acrylate FX-13 | | | | | | | | 66.7 | | | | | |
| Methacrylate FX-14 | | | | | | | | | 36.2 | | | | |
| Isobornyl Acrylate | | | 13.1 | | | | | | | | | | |
| Isocyanato Ethyl Methacrylate | | | | | | | | | | 36.0 | 73.0 | 71.8 | |
| Iso-Octyl Acrylate | | | | | | | | | | | | | 36.1 |
| Urethane of Isocyanatomethacrylate | | | | | | | | | | | | | |
| 1H, 1H, 11H—Eicosafluoroundecyl Acrylate | 49.8 | 18.8 | 46.5 | 46.5 | 18.8 | 45.5 | 18.8 | 31.3 | 36.2 | 36.0 | 24.5 | 23.9 | 36.1 |
| trimethylolpropane triacrylate | | 22.8 | | | 22.8 | | 22.8 | | 25.4 | 25.7 | | | 25.4 |
| γ-Methacryloxypropyltrimethoxy silane | 2.8 | 1.5 | 1.8 | 1.7 | 1.5 | 3.0 | 1.5 | 1.3 | 1.5 | 1.4 | 1.5 | 2.9 | 1.5 |
| 2-hydroxy-2-methyl-1-phenylpropan-1-one | 1.4 | .75 | .9 | .9 | .8 | 1.5 | .75 | .7 | .7 | 1.0 | .9 | 1.4 | 1.0 |
| 3-Methacryloxy propyltris (methoxy ethoxy silane) | | | | | | | | | | | | | |
| Refractive Index of Composition (uncured) | 1.4516 | 1.4254 | 1.442 | 1.415 | 1.369 | 1.412 | 1.365 | 1.4051 | 1.388 | 1.415 | 1.446 | 1.4344 | 1.409 |

| Components/Composition | 14 | 15 | 16 | 17 | 18 | 19 | 20 | 21 | 22 | 23 | 24 | 25 | 26 | 27 |
|---|---|---|---|---|---|---|---|---|---|---|---|---|---|---|
| Dimethyl Itaconate | | 71.1 | | | | | | | | | | | | |
| 1H, 1H, 11H—Perfluoroundecyl Methyl Itaconate | | | | | | | | | | | | | | |
| Di—1H, 1H, 11H—Perfluoroundecyl Maleate | | | | | | | | | | | | | | |
| Perfluoroundecyl Crotonate | | | | | | | | | | | | | | |
| Acrylate FX-14 | | | | | | | | | | | | | | |
| Methacrylate FX-14 | | | | | | | | | | | | | | |
| Isobornyl Acrylate | | | 47.0 | | | | | | | | | | | |
| Isocyanato Ethyl Methacrylate | | | | | | | | | | | | | | |
| Iso Octyl Acrylate | | | | | | | | | | | | | | |
| Urethane of Isocyanatomethacrylate | 90.4 | | | | | | | | | | | | | |
| 1H, 1H, 11H—Eicosafluoroundecyl Acrylate | | | | 10.0 | 89.0 | 88.0 | | | | | | | | |
| Crotyl Perfluoro Octanoate | | | | | | | 73.7 | 73.7 | 73.7 | 73.7 | 73.7 | 48.0 | 48.3 | 39.8 |
| Allyl Acrylate | | | | | | | | | | | | | 0.7 | 13.9 |
| 5-Hexenyldimethylchlorosilane | | | | | | | | | 1.7 | | | | | |
| N(3 acryloxy-2-Hydroxy Propyl) 3 Amino propyltriethoxy silane | | | | | | | | 1.7 | | | | | | |
| 3-Methacryloxy Propyl-dimethyl Chlorosilane | | | | | | | | | | | 1.7 | | | |
| 1,3,5-Trivinyl 1,1,3,5,5-trimethyltrisiloxane | | | | | | | | | | 1.7 | | | | |
| 3-Methacryl propyl-tris Methoxy ethoxy silane | | | | | | | 1.7 | | | | | | | |
| trimethylolpropane triacrylate | 6.3 | 23.7 | 3.1 | 86.0 | 5.7 | 8.7 | 23.8 | 23.8 | 23.8 | 23.8 | 23.8 | 3.8 | 6.2 | 38.0 |
| γ-Methacryloxypropyltrimethoxy silane | 2.1 | 2.8 | 1.9 | 3.4 | 3.7 | 1.9 | 0.7 | 0.7 | 0.7 | 0.7 | 0.7 | 1.4 | 1.4 | 4.8 |
| 3-Methacryloxy propyl tris (methoxy ethoxy silane) | 1.2 | 2.4 | 0.9 | 1.1 | 1.7 | 1.7 | | | | | | 47.0 | 43.4 | 3.2 |
| Triallyl cyanurate | | | | | | | | | | | | | | |
| Refractive Index of Composition (uncured) | 1.3444 | 1.3931 | 1.4129 | 1.4555 | 1.3495 | 1.4665 | 1.3719 | 1.3731 | 1.3723 | 1.3725 | 1.3736 | 1.4168 | 1.4109 | 1.4680 |
| Components/Composition | 28 | 29 | 30 | 31 | 32 | 33 | 34 | 35 | 36 | 37 | | | | |

Dimethyl Itaconate
1H, 1H, 11H—Perfluoroundecyl Methyl Itaconate
D1—1H, 1H, 11H—Perfluoroundecyl Maleate

TABLE II-continued

| | | | | | | | | | |
|---|---|---|---|---|---|---|---|---|---|
| Perfluoroundecyl Crotonate Acrylate FX-13 | | | | | | 50.0 | | 50.0 | 74.0 |
| Methacrylate FX-14 | | | | | | | 25.0 | | |
| Isobornyl Acrylate | | | | | | | | | |
| Isocyanato Ethyl Methacrylate | | | | | | | | | |
| Iso-Octyl Acrylate | | | | | | | | | |
| Urethane of Isocyanomethacrylate 1H, 1H, 11H—Eicosafluoroundecyl Acrylate | 28.7 | | | | | | | | |
| | 36.0 | | | | | | | | |
| Crotyl Perfluoro Octunoate | | | | 22.0 | 14.6 | | | | |
| Allyl Acrylate | | | | 27.5 | 35.0 | | | | |
| Octyl Crotonate | 48.5 | 50.0 | | | | 25.0 | 25.0 | 46.0 | 24.0 |
| trimethylolpropane triacrylate | 46.0 | 45.0 | | | 17.6 | 45.5 | 45.5 | 46.0 | |
| γ-Methacryloxypropyltrimethoxy silane | 2.9 | 3.0 | | 1.3 | 2.5 | 3.0 | 3.0 | 3.0 | 1.7 |
| 2-hydroxy-2-methyl-1-phenylpropantone | 1.7 | 1.5 | | 1.5 | 15.0 | 1.5 | 1.5 | 1.5 | |
| 3-Methacryloxy propyl tris (methoxy ethoxy silane) | | | | | | | | | |
| Triallyl Cyanurate | 30.7 | | | 48.0 | 15.0 | | | 46.0 | |
| Refractive Index of Composition (uncured) | 1.4226 | 1.4432 | 1.4443 | 1.4770 | 1.4895 | 1.4266 | 1.4194 | 1.4111 | 1.4435 | 1.3770 |

The following examples are also illustrative of the present invention and are not intented to limit the scope thereof.

EXAMPLE 1

A three component curable system was prepared as follows:

A receptacle suitable for preparing a 10 gram batch, equipped with a stirring bar, was charged with the following components in weight percentage in sequence:

vinyl trimethoxy silane—12.0%
trimethylolpropane triacrylate—87.0%
2-hydroxy-2-methyl-1-phenylpropan-1-one—1.0%

After the addition was completed the compositions was thoroughly mixed and UV cured on a substrate.

EXAMPLE 2

The procedures of Example 1 were substantially repeated except a fourth component was added the following components was added to the batching receptacle.

allylphenolether—10.0%
γ-methacryloxypropyltrimethoxy silane—2.0%
trimethylolpropane triacrylate—87.0%
2-hydroxy-2-methyl-1-phenylpropan-1-one—1.0%

EXAMPLE 3

The procedures of Example 2 were substantially repeated except the following components were added to the receptacle.

lauryl acrylate—10.0%
trimethylolpropane triacrylate—87.0%
γ-methacryloxypropyltrimethoxy silane—2.0%
2-hydroxy-2-methyl-1-phenylpropan-1-one—1.0%

After the monoene, polyene and curing initiator components are combined and blended, and if desired, additional functional materials (as may be desired), the curable coating composition is applied to a substrate and thereafter exposed to a free radical generator such as actinic radiation to give an essentially solid overcoating to a substrate.

The curing reaction is preferably initiated by either UV/VIS radiation or high energy ionizing radiation. The UV radiation can be obtained by special light sources which emit significant amounts of UV light having a wavelength in the range of about 2000 to about 4000 Angstrom units. When UV radiation is used for a curing reaction, a dose of about 50 to 250 watts/in$^2$ is employed.

The curing rate of the UV curable compositions is dependent upon the intensity of UV light which initiates cross linking within the composition. UV lamp systems are available in a wide range of power output and bulb lengths to provide the desired rate for each separate application.

When UV radiation is used for curing a composition, a photosensitizer may be added to the composition.

The present curable coating compositions provide better mechanical and moisture protection than silicone resin-thermoplastic coating compositions and increased curable high draw rates which reduce the total cost of production, particularly in glass fiber fabrication. These facts make the present coating compositions very attractive as glass optical fiber coating materials. Moreover, these curable coating compositions are characterized by the ability to be tailored to meet the specific requirements of varied applications.

As mentioned above, it is possible to apply the compositions of this invention as coatings to opticl articles, such as a fiber optic core or substrate, to contain transmitted energy or strip energy from the core. As an example of the coating composition's ability to remove energy, a semi-graded index fiber having a coating composition or layers of coating compositions can be formed. This fiber would be formed by applying a composition of the present invention with a desired refractive index to the substrate core or by sequentially applying compositions of different refractive indicies around the core. Specifically, the refractive index of the coating composition should be higher than the refractive index of the fiber optic at its outer diameter. Successive layers of coating compositions should also be higher than the previous layer.

An example of an optical fiber of this structure is semi-graded fiber having a fused silica outer layer with a composition such as that disclosed at No. 1 in TABLE II. The respective refractive indicies of the outer surface of the silica core is 1.456 and 1.48 for the cured coating composition.

To illustrate a situation where it is desired to contain energy within an optical article, such as an optical fiber core, a coating composition having a lower refractive index than the substrate fiber core is used. An example of one such coated optical fiber is the combination of a fused silica core (which has a refractive index of 1.456) with a coating composition such as that disclosed at No. 5 in TABLE II. Successive layers of coatings having varying refractive indices to the first coating layer may also be applied.

The ability to vary the refractive index of the coating composition allows for the composition to be used on anti-reflective applications such as lenses and the like.

As will be apparent to persons skilled in the art, various modifications, adaptations and variations of the foregoing specific disclosure can be made without departing from the teachings of this invention.

We claim:

1. An optical fiber comprising an optical fiber substrate selected from the group consisting of silica, glass and quartz, and a coating composition bonded to said fiber substrate, said composition comprising the cured reaction product of at least one ethylenically unsaturated monoene, an ethylenically unsaturated polyene, and a curing initiator.

2. The fiber of claim 1 wherein said coating composition comprises a cladding layer having a lower refractive index than said substrate to contain energy within said optical fiber substrate.

3. The fiber of claim 2 further including at least one additional layer of said cured coating composition applied to the substrate-bonded cladding layer, each of said additional layers having a different refractive index than said substrate-bonded cladding layer.

4. The fiber of claim 1 wherein said coating composition has a higher refractive index than said substrate to remove energy from said optical fiber substrate.

5. The fiber of claim 1 wherein said composition contains about 10.0 to about 95.0 weight percent of the ethylenically unsaturated monene, about 2.0 to about 70.0 weight percent of the ethylenically unsaturated polyene, and about 0.4 to about 20.0 weight percent of the curing initiator.

6. The fiber of claim 1 wherein said composition contains about 35.0 to about 95.0 weight percent of the ethylenically unsaturated monoene, about 4.0 to about 45.0 weight percent of the ethylenically unsaturated polyene, and about 0.7 to about 10.0 weight percent of the curing initiator.

7. The fiber of claim 1 wherein the ethylenically unsaturated monoene or polyene contains a silane functional group.

8. The fiber of claim 1 wherein the ethylenically unsaturated monoene or polyene contains an alkoxy or hydroxy functional group.

9. The fiber of claim 1 wherein said ethylenically unsaturated monoene or polyene contains a halogen.

10. The fiber of claim 9 wherein the halogen is fluorine.

11. The fiber of claim 1 wherein said monoene or polyene includes an acrylate.

12. The fiber of claim 1 wherein said monoene or polyene includes a methacrylate.

13. The optical fiber comprising an optical fiber substrate selected from the group consisting of silica, glass and quartz, and a coating layer bonded to said fiber substrate, said coating layer comprising the cured reaction product of about 10.0 to about 95.0 weight percent of an ethylenically unsaturated monene, about 2.0 to about 70.0 weight percent of an ethylenically unsaturated polyene, and about 0.4 to about 20.0 weight percent of a curing initiator.

14. The fiber of claim 13 wherein said coating layer comprises a cladding having a lower refractive index than said substrate to contain energy within said optical fiber substrate.

15. The fiber of claim 14 further including at least one additional layer of said cured reaction product applied to the substrate-bonded cladding layer, each of said additional cladding layers having a different refractive index than said substrate-bonded cladding layer.

16. The fiber of claim 13 wherein said coating composition has a higher refractive index than said substrate to remove energy from said optical fiber substrate.

17. The fiber of claim 13 wherein said composition contains about 35.0 to about 95.0 weight percent of the ethylenically unsaturated monoene, about 4.0 to about 45.0 weight percent of the ethylenically unsaturated polyene, and about 0.7 to about 10.0 weight percent of the curing initiator.

18. The fiber of claim 13 wherein the ethylenically unsaturated monoene or polyene contains a silane functional group.

19. The fiber of claim 13 wherein the ethylenically unsaturated monoene or polyene contains an alkoxy or hydroxy functional group.

20. The fiber of claim 13 wherein said ethylenically unsaturated monoene or polyene contains a halogen.

21. The fiber of claim 20 wherein the halogen is fluorine.

22. The fiber of claim 13 wherein said monoene or polyene includes an acrylate.

23. The fiber of claim 13 wherein said monoene or polyene includes a methacrylate.

* * * * *

UNITED STATES PATENT AND TRADEMARK OFFICE
CERTIFICATE OF CORRECTION

PATENT NO. : 4,707,076

DATED : November 17, 1987

INVENTOR(S) : Bolesh J. Skutnik & Harry L. Brielmann, Jr.

It is certified that error appears in the above-identified patent and that said Letters Patent is hereby corrected as shown below:

Column 2, line 35, wherein the words "opticl" should be --optical--

Column 12, line 2, wherein the words "opticl" should be --optical--

Column 3, line 32, no heading of the table appears, should be --D-2 Scale Shore Hardness--.

Signed and Sealed this

Sixth Day of February, 1990

Attest:

JEFFREY M. SAMUELS

*Attesting Officer*   *Acting Commissioner of Patents and Trademarks*